Aug. 7, 1951 W. P. OEHLER ET AL 2,563,185
TRACTOR IMPLEMENT ATTACHMENT
Filed Sept. 19, 1945 2 Sheets-Sheet 2
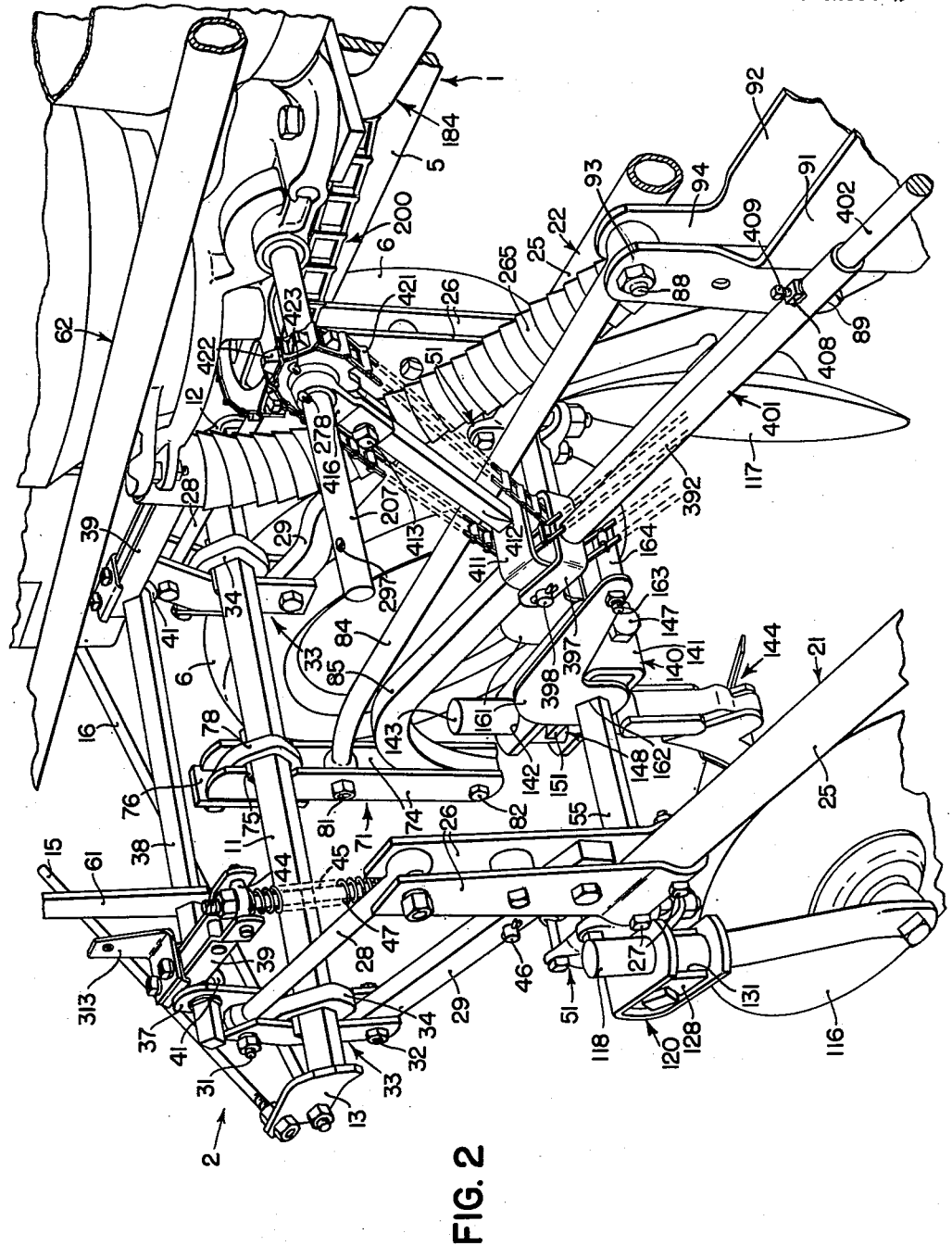
FIG. 2
*INVENTORS*
WILLIAM P. OEHLER
GUY W. ADE
BY
*ATTORNEYS.*

Patented Aug. 7, 1951

2,563,185

UNITED STATES PATENT OFFICE 2,563,185

TRACTOR IMPLEMENT ATTACHMENT

William P. Oehler and Guy W. Ade, Moline, Ill., assignors to Deere & Company, Moline, Ill., a corporation of Illinois Application September 19, 1945, Serial No. 617,238

6 Claims. (Cl. 97—47)

The present invention relates generally to agricultural implements and more particularly to implements for planting and fertilizing.

The object and general nature of the present invention is the provision of a new and improved planting and fertilizer atttachment particularly adapted for mounting on a tractor equipped with cultivating tools. More specifically, an important feature of this invention is the provision of simplified mountings for the seed and fertilizer furrow openers materially facilitating their attachment to and detachment from the associated parts of the cultivator rigs or other cultivator structure carried by the tractor. It is also a feature of this invention to provide a fertilizer furrow opener and seed furrow opener connected for floating movement with the draft bar of a cultivator but movable independently of the cultivator rig beams and to mount on the latter, as, for example, in different optional positions, ground working tools which cooperate with the furrow openers.

It is also a feature of this invention to provide new and improved means associated with the cultivator rigs, particularly the raising and lowering mechanism therefor, whereby the planting and fertilizing furrow openers are raised automatically.

These and other objects and advantages of the present invention will be apparent to those skilled in the art after a consideration of the following detailed description of the preferred form in which the principles of the present invention have been incorporated and which are illustrated in the accompanying drawings.

In the drawings:

Figure 2 is another perspective view of the implement attachments shown in Figure 1, showing particularly the optional mounting of the ground working tools carried by the cultivator rig beams and also showing the hill drop attachment.

Figure 3 is a fragmentary view of one of the clamps used for securing a ground working tool to the spread bar.

Figure 1:
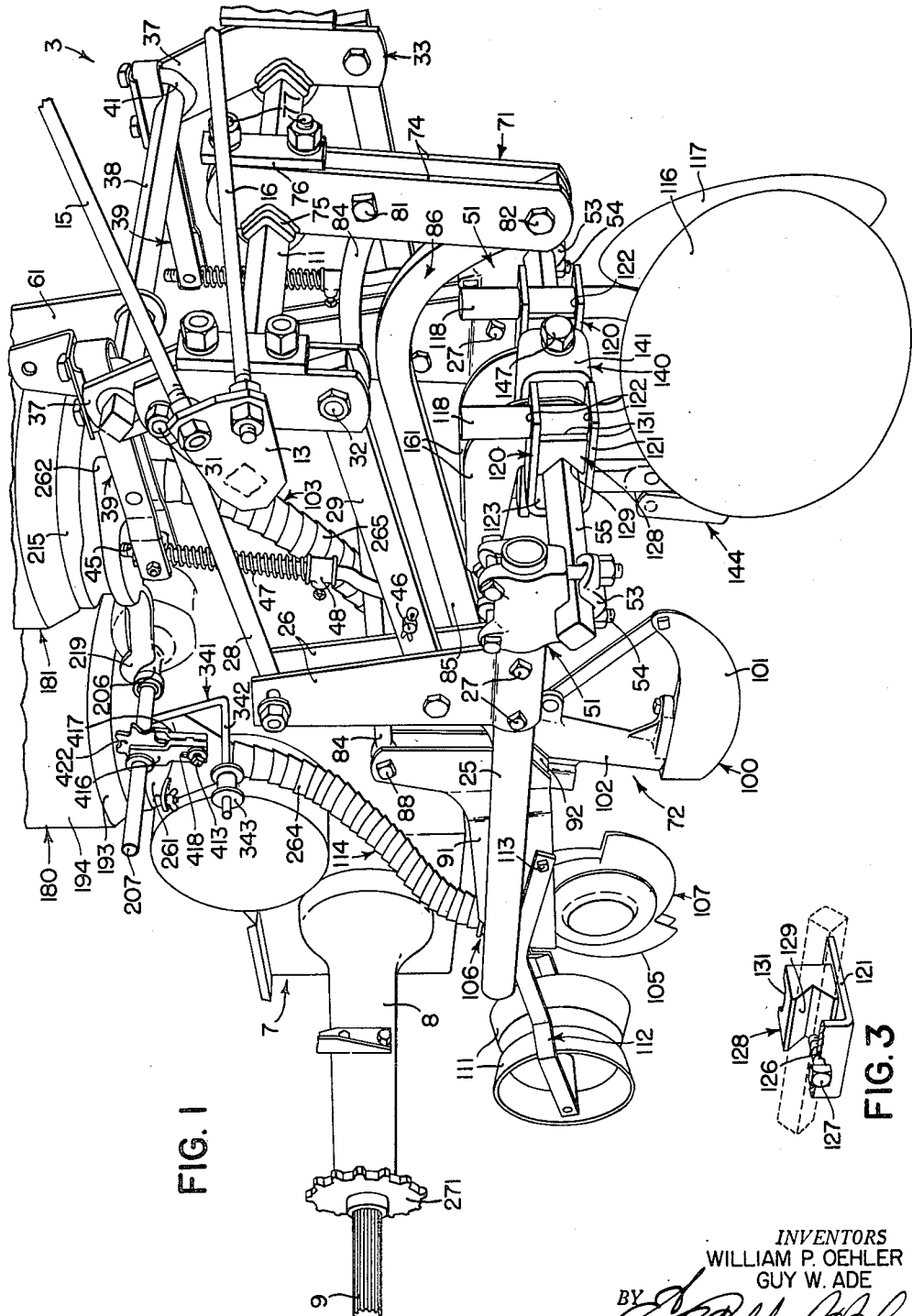
Figure 1 is a perspective view of a tractor cultivator with which is associated planting and fertilizing attachments incorporating the principles of the present invention.

Referring now more particularly to Figures 1, 2 and 3, the new and improved planter and fertilizer attachments with which the present invention is more particularly concerned is shown as mounted on a farm tractor 1 on which right and left hand cultivator attachments 2 and 3 are mounted. These cultivator attachments are, in general, identical and therefore corresponding parts of the right and left hand units will be indicated by the same reference numerals. The same is true of the planter and fertilizer attachments. The tractor 1 is largely conventional, embodying right and left hand frame bars 5 supported at their front ends on front steering wheels 6 and connected at their rear end with the motor and transmission unit 7 to which right and left hand axle housings 8 are connected. A rear axle shaft 9 is supported for rotation in each of the axle housings 8. Each of the cultivator attachments 2 and 3 includes a laterally outwardly extending draft bar 11 formed with or attached to an attaching plate 12 at its inner end by which the draft bar may be fixed to the side of the tractor. At its outer end each of the draft bars 11 receives a plate bracket 13 which is apertured at its forward edge so as to receive the outer threaded ends of a pair of brace rods 15 and 16 which at their inner ends are attached to the front of the tractor. Each draft bar 11 receives a pair of cultivator rigs indicated generally at 21 and 22. Each rig includes a rig beam 25 to the forward end of which a pair of standards 26 are fixed, as by bolts 27. The standards 26 are apertured to receive bolts or pins which pivotally connect the rear ends of a pair of upper and lower links 28 and 29 which, at their forward ends are pivoted, as at 31 and 32, to an attaching bracket 33 which is clamped to the draft bar 11 by any suitable means, such as a U-bolt 34. Each of the brackets 33 is extended upwardly, as at 37, and is apertured to receive suitable bearing means supporting a rockshaft 38 on the draft bar 11. A pair of lifting arms 39 is fixed to the rockshaft 38 by any suitable means, such as a U-bolt 41, and the outer end of each lifting arm 39 carries a swivel 44 through which a lifting rod 45 extends. The lower end of each lifting rod 45 is bent laterally, as at 46, and inserted through an opening in the lower link 29. A compression spring 47 is disposed between each swivel 44 and an abutment collar 48 or the like fixed to the lower portion of the associated lifting link 45.

A clamp casting 51 is fixed to the front end of each cultivator rig beam 25, forwardly of the standards 26 secured thereto, and each member 51 includes a lower clamping cap 53 and associated bolt means 54 which secure a spread bar 55 to the front ends of the cultivator rig beams 25. The spread bar 55 thus holds the two cultivator rig beams 25 rigidly together so that they are raised and lowered simultaneously whenever the rockshaft 38 is rocked. Each of the rockshafts 38 carries an upwardly extending arm 61, preferably welded thereto, each arm 61 being apertured to receive suitable means connecting the front end of a longitudinally extending lift member 62 thereto. The lift member 62 at each side of the tractor is actuated in any suitable manner and is shifted generally longitudinally to raise the tools, as in a conventional tractor mounted cultivator.

An attachment bracket 71, forming a part of the planter and fertilizer attachment that is indicated in its entirety by the reference numeral 72, is fastened to the forward side of each draft beam 11. Each attachment bracket comprises a pair of plates 74 disposed in laterally spaced relation and notched at their upper ends and along the rear edges to receive a short section of angle which forms a socket 75. The angle is preferably welded to the plates 74. Along their front edges, at the upper end of the bracket 71, an apertured plate 76 is welded and is apertured to receive the ends 77 of a U-bolt 78 which embraces the central portion of the associated draft bar 11. Below the U-bolt 78 the plates 74 are apertured to receive pins or bolts 81 and 82 which form means pivotally connecting upper and lower links 84 and 85 to the lower portion of the attachment bracket 71. The forward portion of the lower link 85 is curved upwardly, as at 86, to clear the spread bar 55 and associated parts and for other reasons as will be explained below. The rear ends of the links 84 and 85 are pivotally connected, as at 88 and 89, to a pair of supporting plates 91 and 92. Preferably, the plates 91 and 92 have apertured upper and forward extensions 93 and 94 which receive the pivots 88 and 89. A fertilizer furrow opener 100, which per se may be of conventional construction, is bolted to the inner plate 92 and is provided with a furrow opener runner 101 and a fertilizer boot 102 which is formed to receive the lower end of a fertilizer tube 103. Between the two mounting plates 91 and 92 is a seeding unit 105, comprising a suitable seed boot and support 106 bolted between the adjacent portions of the plates 91 and 92 and provided with a double disk seed furrow opener 107. As best shown in Figure 1, a pair of press wheels 111 is mounted in a press wheel frame 112 which is made up of bars that are pivoted at 113 to the plates 91 and 92. The press wheel frame 112 may float free, or it may be fixed to the plates 91 and 92. The double disk furrow opener 107 is of the variable depth type, and the supporting casting 106 receives the lower end of a seed tube 114. Normally, the furrow opener 107 is disposed substantially midway between the two rig beams 25 while the fertilizer furrow opener 101 is disposed slightly to one side of the center line. The two furrow openers are capable of floating or movement independent with respect to the cultivator rig beams, by virtue of the generally parallel link connection 84, 85 with the auxiliary attaching bracket 74, and since the links 84 and 85 are both below the draft bar 11 and also because the attachment bracket 71 is fastened to the front side of the tractor-carrier draft beam 11, the attachment of the furrow opener units to the tractor and the detachment therefrom is readily accomplished without removing any part except the U-bolt 78.

Reference was made above to the fact that the spread bar 55 is adapted to receive ground working tools in different optional positions thereon. Referring first to Figure 1, said ground-working tools include a pair of furrowing disks 116 and 117 disposed generally centrally between the two rig beams 25, each disk being mounted on a vertical shank 118. Each shank or standard 118 is secured to the spread bar 55 by a clamp 120, and each clamp comprises a U-shaped member 121 having its ends apertured, as at 122, to receive the shank 118. The rear or intermediate portion 123 of the U-shaped member 121 is tapped, as at 126, to receive a cap screw 127. A block 128 is disposed between the upper and lower portions of the U-shaped member 121 and at one side is formed with a horizontal V-shaped socket 129 and, at the other side, with a vertical arcuate or semi-circular socket 131. The latter is adapted to seat against the shank 118 while the horizontal V-shaped socket 129 is adapted to seat against the spread bar 55. The planting parts assembled in operative position are shown in Figure 1, from which, in connection with Figure 3, it can be seen that when the cap screw 127 is tightened the inner end bears against the spread bar 55 and forces the member 128 against the shank 118, firmly holding the same in the openings 122. Figure 1 shows the two clamping members 120 disposed in the generally central portion of the spread bar 55, which disposes the disks 116 and 117 close together. If desired, as when hills or beds are required, the disks 116 and 117 may be arranged as shown in Figure 2, namely, in a wide spread position, in which the clamping members 120 are disposed on the spread bar laterally outwardly of the rig beams and their clamps 51, with the disks 116 and 117 angled so as to bring the soil laterally inwardly to form the desired bed or hill.

When the furrow forming disks 116 and 117 are arranged as shown in Figure 1, a center clamp 140 is mounted on the spread bar between the clamps 120. The clamp 140 is of substantially the same construction as the clamps 120 just described, comprising a U-shaped member 141 apertured at its forward ends, as at 142, to receive the shank 143 of a center tool 144, which may be of conventional construction. The central portion of the U-shaped member 141 is tapped to receive a set screw 147 which, in operation, bears against one edge of the spread bar 55. Between the latter and the shank 143 is an abutment member 148 which is substantially the same as the member 128 mentioned above except that it is longer and has a reenforcing rib 151 (Figure 2). The member 148 has an arcuate socket to receive the shank 143. The center tool 144 preferably is used both with the disks 116 and 117 clamped to the central portion of the spread bar 55 as well as when they are clamped to the ends thereof, as shown respectively in Figures 1 and 2.

Mention was made above of the fact that when the rockshaft 38 is rocked the cultivator rig beams 25 and associated parts are raised. Since the spread bar 55 is fixed directly to the beams 25, the rocking of the rockshaft 38 therefore to raise the disks 116 and 117 as well as the central tool 144. According to the principles of the present invention new and improved means is provided for raising the furrow opener unit 100 and 107 automatically whenever the disks 116 and 117 are raised. To this end, a pair of L-shaped plates 161 is provided, each having an opening 162 to receive the spread bar 55, as best shown in Figure 2. The plates 161 are loose or slidable on the spread bar 55 but are held in assembled relation by means of a bolt 163 and a spacer or bushing 164 which is held in position between the end portions of the plates 161 when the bolt 163 is tightened, the bushing 164 being mounted on the bolt 163. It will be seen from Figures 1 and 2 that the bushing 164 and bolt 163 are of such length that when the plates 161 are assembled on the spread bar 55 and fastened together, there is just sufficient space to receive the clamp 140 therebetween. The clamp 140 therefore serves as means for holding the plates 161 in position on the spread bar. The rearwardly extending portions of the plate 161, which carry the bushing 164, are disposed substantially underneath the lower link 85 and the parts are so arranged that when the disks and furrow openers are in operating position there is sufficient space between the bushing 164 and the link 85, as shown in Figure 2, to accommodate the independent floating movement of the furrow opener units mentioned above. However, when the disks 116 and 117 are raised by virtue of the rocking movement of the rockshaft 38, the bushing 164 comes into engagement with the lower edge of the link 85 and therefore lifts the tools 100 and 107 associated with the plates 91 and 92 to which the links 84 and 85 are connected. It will be noted that the bushing 164 engages the link 85 well towards the rear end of the latter. This provides a very easy method of raising the furrow opener units 100 and 107 and does not overload the lifting mechanism, yet when the parts reach their raised or transport position, the tools 100 and 107 are lifted to adequate height, preferably the same as the height to which the disks 116 and 117 are raised.

For selecting and dispensing seed and fertilizer for delivery to the furrow opener units 100 and 107, there are provided seed and fertilizer hoppers at the side of the tractor, each seed hopper being indicated by the reference numeral 180 and each fertilizer hopper by the reference numeral 181. Each seed hopper 180 is supported on a mounting bracket 184, best shown in Figures 2. The seed hopper bottom is indicated by the reference numeral 193 and the seed hopper 180 includes a seed can 194 mounted on the hopper bottom 193.

The seed hopper bottom 193, as well as the fertilizer hopper bottom 215 is similar to the construction shown and claimed in the United States Patent 2,319,737, issued May 18, 1943, to Theodore W. Johnson. It may be mentioned, however, that the speed hopper 180 includes sleeve sections 206 which are bored to receive a seeding shaft 207, and that each of the hopper bottoms 193 and 215 is provided with a dispensing spout, as indicated at 261 and 262, respectively, by which seed and fertilizer is delivered through tubes 264 and 265 to the seed furrow opener 105 and fertilizer furrow opener 100, as best shown in Figure 1. The fertilizer hopper bottom 215 includes hook sections 219 which engage over the corresponding sleeve sections 206 for connecting the two hoppers together. It may also be mentioned that the shaft 207 is driven by a chain connection with the sprocket 271 on the axle shaft, the shaft being driven through clutch mechanism (not shown) held in place on the shaft 207 by the cotter 278 and a pin inserted in the opening 297 in the shaft, the clutch mechanism being controlled by an arm 313 on the rockshaft 38. The aforesaid chain connection is held taut by an arm 341 (Figure 1) pivotally mounted on the hopper bottom 193 and including an outwardly directed section 342 on which a chain engaging roller 343 is mounted. The shaft 207 may be arranged to drive a hill drop attachment through a lower chain 392, trained over a double sprocket journaled in a yoke 397 that forms a part of a lower tubular member 401, and an upper chain 421 trained over a sprocket 422 held on the shaft 207 by a pin 423. The lower end of the member 401 receives a rod 402, whose position relative to the member 401 may be adjusted by set screw lock means 408, 409. The yoke 397 is pivoted at 398, to a yoke 411 to which the lower end of a shank 412 is fixed, the upper end of the shank 412 being fixed by bolt means 413 to a pair of attaching members 416 and 417, the latter being slotted, as at 418, to receive the bolt 413.

The arrangements shown in Figures 1 and 2 are ordinarily employed after the ground has been plowed and disked and left in a level condition, the implement shown in Figure 1 serving to plant in furrows formed by the disks 116 and 117 when they are disposed close together while, in Figure 2, the planting is done on ridges or beds thrown up by the disks 116 and 117 in their spaced apart position. Under other conditions the beds or ridges may be formed before the planting is done, in which case the planting implement need not be provided with ground working tools for forming either beds or furrows. In that case, the seed and fertilizer furrow openers need not be separately mounted but may, instead, be mounted directly on the cultivator beams 25.

The arrangement shown in Figure 1 is one in which the press wheels 111 serve as gauge wheels, the press wheel frame bars 112 being bolted rigidly to the plates 91 and 92. Thus, the planting and fertilizing units float with respect to the tractor and also with respect to the furrow forming disks 116 and 117 and the center clearing tool 144. The furrow opener 107 is of the variable depth type and the seed from the seed dispensing unit 180 is deposited continuously. Under some conditions it may be desirable to deposit the seed in hills, for example, two, three or four kernels in a hill. When an arrangement of this kind is desired, the seed furrow opener unit 105 is replaced by a seed furrow opener unit of the hill drop type.

In the form of the invention shown in Figure 2, variations in the row spacing may be secured by shifting the cultivator rig brackets 33, and the associated planter unit bracket 71, along the draft bar 11.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. The combination, with a tractor-mounted implement having a transverse draft beam and a pair of spaced longitudinally extending rig beams connected with said draft beam for raising and lowering movement with respect thereto, of an attachment comprising a transverse spread bar fixed to said rig beams with the central portion of the spread bar disposed between the rig beams, an agricultural unit connected with said draft beam for generally vertical movement relative thereto, a vertically disposed bracket, means for connecting the upper end portion of said bracket to said draft beam, a pair of link members pivotally connected at their forward ends with the lower portion of said bracket below said draft beam and pivotally connected at their rear ends with said agricultural unit, and an arm fixed at its forward end to said spread bar in a position below one of said link members and carrying means at its rear end engageable with said one link member, whereby raising said rig beams would also raise said unit.

2. The combination, with a tractor-mounted implement having a transverse draft beam and a pair of spaced longitudinally extending rig beams connected with said draft beam for raising and lowering movement with respect thereto, of an attachment comprising a transverse spread bar fixed to said rig beams with the central portion of the spread bar disposed between the rig beams, an agricultural unit, means movably connecting said agricultural unit with said draft beam in a position between said rig beams, a lifting member mounted on said spread bar in a position to engage said connecting means for lifting said agricultural unit whenever said rig beams are raised, a pair of ground-working tools carried by said spread bar forwardly of said agricultural unit, and attaching means fixing said ground-working tools to said spread bar, said attaching means being disposed on opposite sides of said lifting member and engageable with the latter for holding said lifting member against displacement on said spread bar.

3. The combination, with a tractor-mounted implement having a transverse draft beam and a pair of spaced longitudinally extending rig beams connected with said draft beam for raising and lowering movement with respect thereto, of an attachment comprising a transverse spread bar fixed to said rig beams with the central portion of the spread bar disposed between the rig beams, a ground-working tool fixed to the central portion of the spread bar, an agricultural unit movably connected with said draft beam independently of said rig beams and including a vertically movable longitudinally extending connecting part passing over but adjacent to the central portion of said spread bar, a pair of arms mounted on said spread bar at opposite sides of said tool, and connecting means securing the outer ends of said arms together and holding the arms at opposite sides of said tool, the fixed tool acting to prevent lateral displacement of said arms relative to said spread bar, said connecting means being engageable with said connecting part for raising said unit when the rig beams and spread bar are raised.

4. For use in a tractor mounted cultivator of the type including a laterally extending draft beam, a pair of generally longitudinaly extending rig beams spaced apart laterally, and separate connections leading, respectively, from said rig beams to said draft beam: the improvement which includes an attachment comprising a spread bar adapted to be fixed at its ends to said rig beams, an agricultural unit adapted to be connected with said draft beam for generally vertical movement relative thereto, a bracket normally disposed generally in a vertical position, means for connecting the upper end portion of said bracket to said draft beam, a pair of link members, both disposable at the under side of said draft beam, extending from the lower portions of said bracket below said draft beam to said agricultural unit, and an arm fixed at its forward end to said spread bar in a position below one of said link members and carrying means at its rear end engageable with said one link member, whereby raising said rig beams will also raise said unit.

5. For use in a tractor-mounted implement including a transversely disposed draft beam and a pair of generally longitudinally extending cultivator rig beams movably connected with said draft beam in laterally spaced apart relation: the improvement comprising an attachment which includes a spread bar adapted to be fixed to said rig beams, an agricultural unit, means for movably connecting said agricultural unit with said draft beam generally in a position between said rig beams, a lifting member mounted on the generally central portion of said spread bar and adapted to engage a portion of said connecting means for lifting said unit whenever said rig beams are raised, a pair of ground-working tools carried by said spread bar forwardly of said unit, and attaching means for fixing said ground-working tools to said spread bar, said attaching means being disposed on opposite sides of said lifting member and engageable with the latter for holding said lifting member against lateral displacement on said spread bar.

6. For use in a tractor-mounted implement including a transversely disposed draft beam and a pair of generally longitudinally extending cultivator rig beams movably connected with said draft beam in laterally spaced apart relation for raising and lowering movement with respect thereto: the improvement comprising an attachment which includes a transverse spread bar adapted to be fixed to said rig beams with the central portion of the spread bar disposed between the rig beams, a ground-working tool fixed to the central portion of the spread bar, an agricultural unit adapted to be movably connected with said draft beam independently of said rig beams and including a vertically movable longitudinally extending connecting part passing over but adjacent to the central portion of said spread bar, a pair of arms mounted on said spread bar at opposite sides of said tool, and connecting means securing the outer end of said arms together and holding the arms on opposite sides of said tool, the fixed tool acting to prevent lateral displacement of said arms relative to said spread bar, said connecting means being engageable with said connecting part for raising said unit when the rig beams and spread bar are raised.

WILLIAM P. OEHLER.
GUY W. ADE.

REFERENCES CITED

The following references are of record in the file of this patent:

UNITED STATES PATENTS

| Number | Name | Date |
|---|---|---|
| 274,351 | Main | Mar. 20, 1883 |
| 473,234 | Munn et al. | Apr. 19, 1892 |
| 812,946 | Mitchell | Feb. 20, 1906 |
| 1,213,641 | Hickman | Jan. 23, 1917 |
| 1,259,826 | Bloom | Mar. 19, 1918 |
| 1,315,578 | Rock | Sept. 9, 1919 |
| 1,876,776 | Smith | Sept. 13, 1932 |
| 2,157,846 | Berndt | May 9, 1939 |
| 2,217,866 | Hipple | Oct. 15, 1940 |
| 2,319,737 | Johnson | May 18, 1943 |
| 2,332,713 | Hand | Oct. 26, 1943 |
| 2,337,662 | Johnson | Dec. 28, 1943 |
| 2,339,689 | Englund | Jan. 18, 1944 |
| 2,354,886 | Silver | Aug. 1, 1944 |
| 2,357,760 | Peacock | Sept. 5, 1944 |
| 2,365,201 | McKahin | Dec. 19, 1944 |
| 2,375,850 | Johnson | May 15, 1945 |
| 2,376,559 | Smith | May 22, 1945 |
| 2,391,975 | Hyland | Jan. 1, 1946 |
| 2,415,934 | Buehler | Feb. 18, 1947 |
| 2,417,931 | Hipple | Mar. 25, 1947 |

FOREIGN PATENTS

| Number | Country | Date |
|---|---|---|
| 93,441 | Sweden | July 14, 1938 |
| 337,483 | Germany | June 7, 1921 |
| 442,097 | Germany | Mar. 18, 1927 |